United States Patent [19]

Kang et al.

[11] 4,336,271

[45] Jun. 22, 1982

[54] TENDERIZATION OF MEAT BY NATURAL ENZYME CONTROL

[75] Inventors: Chunghee K. Kang, Hinsdale; Ronald F. Jodlowski, Lemont; Thomas H. Donnelly, Western Springs; William D. Warner, Elmhurst, all of Ill.

[73] Assignee: Swift Independent Packing Company, Chicago, Ill.

[21] Appl. No.: 191,372

[22] Filed: Sep. 29, 1980

[51] Int. Cl.³ .......................... A22C 21/00; A23L 1/31
[52] U.S. Cl. ........................................ 426/55; 426/58; 426/271; 426/281
[58] Field of Search ...................... 426/55, 56, 58, 271, 426/281

[56] References Cited

U.S. PATENT DOCUMENTS

| | | |
|---|---|---|
| 2,169,081 | 8/1939 | James . |
| 2,489,918 | 11/1949 | Menges . |
| 2,805,163 | 9/1957 | Williams et al. .................. 426/58 |
| 2,903,362 | 9/1959 | Beuk, et al. . |
| 2,960,406 | 11/1960 | Cardon . |
| 2,999,020 | 9/1961 | Williams ............................ 426/58 |
| 3,006,768 | 10/1961 | Williams ............................ 426/55 |
| 3,119,696 | 1/1964 | Williams ....................... 426/281 X |
| 3,241,974 | 3/1966 | Seiden . |
| 3,519,433 | 7/1970 | Reece ................................. 426/2 |
| 3,561,976 | 2/1971 | Weber ................................ 426/2 |
| 3,577,242 | 5/1971 | Jenevein . |
| 3,818,106 | 6/1974 | Kang et al. ....................... 426/2 |
| 4,224,349 | 9/1980 | Gooch et al. ................... 426/281 |

FOREIGN PATENT DOCUMENTS 510930 3/1955 Canada .

OTHER PUBLICATIONS

Biochemistry, vol. 15, No. 10, 1976, pp. 2159–2167.
Journal of Food Science, vol. 40 (1975), pp. 1119–1121.
The National Provisioner, Dec. 27, 1975, p. 20.

Primary Examiner—Robert A. Yoncoskie
Attorney, Agent, or Firm—Charles E. Bouton

[57] ABSTRACT

Method for accelerating the tenderization of meat by natural enzymes by antemortem injection of selected activators of specific natural enzymes and/or binding agents for enzyme inhibitors naturally present in meat, promptly slaughtering the animal or fowl after injection and holding the meat within the optimum temperature range of the natural enzyme for about 2 days.

10 Claims, No Drawings

TENDERIZATION OF MEAT BY NATURAL ENZYME CONTROL

This invention relates to a method for tenderizing meat by controlling the natural enzymes indigenous to meat and, more particularly, relates to a method for accelerating the proteolytic activity of enzymes naturally present in meat by treating the enzymes with specific activators and inhibitors to the enzyme inhibitors or binding agents of enzyme inhibitors and thereafter holding the meat within the optimum temperature range of the natural enzyme for about two days.

It has long been known that meat contains natural enzymes which act to tenderize it whenever held for sufficient time under the proper conditions. For instance U.S. Pat. No. 2,169,081 to James teaches a process for utilizing naturally occurring enzymes to tenderize meat. In an effort to reduce the time required to obtain the desired degree of tenderness, we have identified, in meat, the proteases and other factors naturally present which may contribute to increasing the tenderness of meat and devised means and methods for enhancing and accelerating their meat tenderizing activity.

Therefore, a principal object of the present invention is to provide a method for reducing the time required to tenderize meat from animals and fowl by accelerating the proteolytic activity of specific enzymes naturally present in meat.

Another object of the present invention is to provide a method for the intravenous treatment of meat bearing animals and fowl to effect accelerated post-mortem tenderization of the meat.

Yet another object of the present invention is to provide a method for the intravenous injection of specific enzyme activators and deinhibitors suitable for accelerating the proteolytic activity of specific enzymes naturally present in meat and thereafter holding the meat within the optimum temperature range of the natural enzymes for sufficient time to permit their proteolytic action to tenderize the meat.

Other objects and advantages of the invention will become apparent as the description proceeds.

Among a number of enzymes naturally present in meat, one enzyme in particular has been found to be a potential major contributor in increasing the tenderness of meat. This protease was identified as a sulfhydryl enzyme which has an optimum pH of 7.0-7.5 and was found to require the presence of free calcium ions to make available its tenderizing activity. This protease is hereafter referred to as the neutral enzyme. In the absence of an activator, such as calcium, the neutral enzyme exhibits no detectable activity. For optimum activity, this protease requires 1 mM or more of free calcium ion concentration in the reaction mixture. Although normal muscle generally contains calcium at a relatively constant level of approximately 40 ppm, practically all of this calcium is bound up with subcellular components present in the muscle fiber and is, therefore, not available as free calcium ions.

It was discovered that there are also naturally occurring inhibitory elements present in meat tissue; and agents may be selected to suppress that inhibitory effect. For instance, it was found that free zinc ions normally present in muscle fiber act as a potent inhibitor to the proteolytic activity of the neutral enzyme but may be controlled with a chelating agent. The levels of zinc in different animals and fowl vary from less than 0.1 mM up to about 1 mM. Interestingly, animals and fowl which naturally exhibit a high degree of tenderness contain very low levels of zinc, and those which are generally considered tough possess relatively high levels of zinc. At a concentration of 0.01 mM zinc (0.65 ppm), the proteolytic activity of the neutral enzyme is approximately 50%, while at a concentration of 0.1 mM zinc (6.5 ppm) approximately 90% of the proteolytic activity of the neutral enzyme is inhibited.

Therefore, it was determined that the amount of free calcium ions present in meat needed to be increased in order to activate the natural proteolytic activity and, at the same time, zinc chelating compounds were needed to bind the free zinc ions naturally present in animal muscle fiber. To diminish the requisite time it was decided to employ antemortem injection of aqueous solutions of calcium salts to promote the proteolytic activity of the neutral protease. Unfortunately, intravenous injection of calcium salts in concentrations sufficient to promote the desired proteolytic activity results in death to the animals and fowl, caused by calcium tetany. However, it was discovered that calcium tetany of the animals and fowl can be avoided by injection of an aqueous solution containing a relatively unionized, soluble calcium salt, such as calcium acetate, with disodium calcium EDTA. In such a mixture most of the injected calcium is bound. Thus, the level of free calcium ions in the blood stream is not elevated enough to cause calcium tetany. The mixture is more effective in preventing tetany than either salt injected alone. Moreover, the disodium calcium EDTA is a chelating agent which selectively binds the free zinc ions naturally present in the muscle fiber, which zinc ions would normally inhibit the accelerated proteolytic activity of the neutral enzyme.

The temperature profile of the neutral protease acting on three different substrates showed the neutral enzyme as having the most consistent proteolytic activity over a wide temperature range for all substrates of any of the other natural proteases tested. The neutral enzyme digested casein in the range of 5° to 70° C. with the optimum at 15° to 20° C., myofibril protein in the range of 5° to 45° C., with the optimum at 30° to 45° C., and native collagen in the range of 5° to 45° C., with the optimum at 25° to 35° C., respectively.

The tenderizing effect of the neutral enzyme made available by antemortem injection of calcium acetate and Na₂CaEDTA solutions in cattle and the effect of aging the meat at the optimum temperature of the neutral enzyme was tested. Sixteen uniform animals of choice grade were selected and divided into two groups of eight. The eight animals of one group were each given a vascular injection of a solution of 0.4 M calcium acetate and 1.0 M Na₂CaEDTA at a rate of 200 ml per 100 pounds live weight. The other eight animals were used as a non-injected control. All cattle were slaughtered within thirty minutes after injection. Following slaughter, one carcass half from each of the animals in both groups was chilled and held at 35° F., under normal packing house conditions, while the other half carcasses were held at 72° F. for two days. Thereafter all carcasses were processed identically. All carcasses were broken into sub-primal cuts, "Cry-O-Vac" (trademark) film packaged, and the chucks shipped to a laboratory for tenderness evaluations. After allowing about one week for normal shipping time, the meat in the form of 5–6 pound roasts was cooked to an internal temperature of 155° F. Subsequent laboratory analysis, standardized mechanical testing for tenderness and testing by a panel of experts clearly showed that the carcasses receiving antemortem injection of calcium acetate and $Na_2CaEDTA$ and held at 72° F. for two days were substantially more tender. Other comparative results also showed that holding the meat at 72° F. without injection was not as effective in producing tenderness as the combination of both treatments. Similar results were obtained from meat injected but not held at the elevated temperature. A portion of meat from each animal was analyzed for total and ionic calcium content. The results showed that antemortem vascular injection of calcium acetate and $Na_2CaEDTA$ is effective in increasing the total and ionic calcium level in the meat.

A second test on cattle using the same procedure as in the first test was made except that half of the carcasses of both groups were subjected to electric stimulation for 10 minutes (768 volts, 15 cycles/sec.) and thereafter all carcasses were chilled under normal packing house conditions. Top round muscles were filleted out for roasts. After cooking the roasts were analyzed in a laboratory and tested mechanically and by a taste panel of experts for tenderness. Unlike the results from the first cattle test, there were no differences in the tenderness scores among the different treatments. There was a similar increase in the muscle calcium level.

The first two tests demonstrate that antemortem injection with calcium acetate and $Na_2CaEDTA$ alone or in combination with electric stimulation did not increase the tenderness of meat. The results of these two tests show that, even after the calcium level in the muscle tissue has been raised to the desired level and the free zinc ions present in meat have been effectively bound by chelating agents, temperature should be maintained within the optimum range of the neutral enzyme. When the proper balance of these factors was maintained immediately after slaughter the degree of tenderness obtained was substantially greater in a shorter length of time than the tenderness produced when the meat was merely held at the elevated temperature without the other factors present.

Sixteen sheep were selected ranging between 100—120 pounds live weight and divided into two groups. The procedure of the first cattle test was used. The test group of eight sheep were given an antemortem vascular injection of a solution of 0.4 M calcium acetate and 1 M $Na_2CaEDTA$. Employing the same variety of mechanical tests, laboratory analysis and testing by a panel of experts as followed in the first cattle tests, and results were substantially identical.

Separate tests were made on sixteen live chickens each weighing 4 pounds and sixteen live turkeys of varying weights. The same procedure as employed in the previous tests was followed except that each bird in the respective test groups was injected subcutaneously with a solution containing 0.2 M calcium acetate and 0.5 M $Na_2CaEDTA$ at the rate of 7.5 ml of solution per 4 pounds. The birds were dispatched within 15 minutes after injection. Both the analysis and test results produced findings the same as in the previous tests.

Antemortem injection is the preferred embodiment of the invention for several reasons. Vascular antemortem injection utilizes the vascular system of the animals to effect a more even distribution of the solution throughout the muscle tissue. It also results in the most efficient use of the materials injected. In the case of fowl, subcutaneous injection is the most efficient because of the difficulty of injecting directly in the birds vascular system and because of the rapid absorption of the solution into the vascular system of the bird. In addition, the pH of meat becomes somewhat lower the longer the meat is held after slaughter thereby resulting in a somewhat lower rate of proteolytic activity of the neutral enzyme. However, other means of introducing the activators are also effective.

To demonstrate the effect of postmortem injection of activators into meat, a 0.85% NaCl solution containing 33 mM calcium acetate and 23 mM $Na_2CaEDTA$ was stitch pumped into one side of beef rounds, and the other side of each round was similarly injected with a 0.85% NaCl solution to give a 4% gain in weight after pumping and a 3% retention upon standing. To minimize variability between control and test, 4 paired rounds from the left and right legs of 4 animals were tested as a group. A first group of eight rounds was taken from rounds which had aged under refrigeration of 35° F. for 24 hours and a second group was taken from warm rounds injected immediately after slaughter. The postmortem pumping of calcium acetate and $Na_2CaEDTA$ resulted in a rise of the total calcium level. The warm test rounds of the second group which were injected with calcium acetate and $Na_2CaEDTA$ and held at 72° F. for two days, were judged the most tender as determined by a trained test panel, by mechanical force measurement and by laboratory analysis of the tissue texture. The resulting increase in the tenderness of these injected test rounds was somewhat less than that produced by antemortem injection. Also, the degree of increased tenderness produced in the warm rounds or in those injected immediately after slaughter was greater than those aged under refrigeration for 24 hours. The difference in tenderness between these two groups clearly shows the importance of holding at the optimum temperature of the neutral enzyme and the gradual lowering of the pH in meat after slaughter.

Obviously many modifications and variations of the invention as hereinbefore set forth may be made without departing from the spirit and scope thereof and, therefore, only such limitations should be imposed as are indicated in the appended claims.

We claim:

1. An improved method for tenderizing meat by control of naturally occurring enzymes, comprising:
    injecting live animals and fowl with an aqueous solution of a unionized calcium salt and a zinc chelating compound in an amount sufficient to raise the concentration of free calcium ions in the muscle tissue to at least 1 mM and to effectively bind the free zinc ions in the meat,
    slaughtering the animals and fowl after injection,
    holding the meat within the optimum temperature of the natural enzyme for a period of time and thereafter processing the tenderized meat in accordance with commercial processing procedures.

2. The method of claim 1 wherein the optimum temperature of the natural enzyme is between 70° and 78° F.

3. The method of claim 1 wherein the aqueous solution is a mixture of calcium acetate and $Na_2CaEDTA$.

4. The method of claim 1 wherein the animals are given an antemortem vascular injection and the fowl are given an antemortem subcutaneous injection.

5. The method of claim 1 wherein the fowl are dispatched within about 15 minutes after injection and the animals are slaughtered within about 30 minutes after injection.

6. The method of claim 1 wherein cattle are given a vascular antemortem injection of about 0.4 M calcium acetate and about 1.0 M Na$_2$CaEDTA at the rate of about 150–250 ml per 100 pounds live weight and holding the meat at about 76° F. for up to two days.

7. The method of claim 1 wherein sheep are given a vascular antemortem injection of about 0.4 M calcium acetate and about 1.0 M Na$_2$CaEDTA at a rate of about 50–100 ml per 100 pounds live weight and holding the meat at about 76° F. for up to two days.

8. The method of claim 1 wherein live chickens and turkeys are given an antemortem subcutaneous injection of a solution containing 0.2 M calcium acetate and 0.5 M Na$_2$CaEDTA in the amount of 7.5 ml per 4 pounds of live weight.

9. An improved method for tenderizing meat by control of naturally occurring enzymes, comprising:
   injecting the meat from animals and fowl after slaughter with an aqueous solution of a calcium salt and a zinc chelating compound in an amount sufficient to raise the concentration of free calcium ions in the muscle tissue to at least 1 mM and to effectively bind the free zinc ions in the muscle tissue, and
   holding the meat within the optimum temperature of the natural enzyme for a sufficient period of time for tenderizing to occur.

10. The method of claim 9 wherein the aqueous solution is a 0.85% sodium chloride solution containing 33 mM calcium acetate and 23 mM Na$_2$CaEDTA in an amount sufficient to produce a 4% weight gain is stitch pumped into the warm meat.

* * * * *